(12) United States Patent
Rowe (10) Patent No.: US 7,276,134 B2
(45) Date of Patent: Oct. 2, 2007

(54) METHODS AND SYSTEMS FOR SEALING LIQUID COOLED STATOR BAR END CONNECTIONS FOR A GENERATOR

(75) Inventor: Raymond Grant Rowe, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 255 days.

(21) Appl. No.: 10/965,784

(22) Filed: Oct. 18, 2004

(65) Prior Publication Data

US 2006/0080828 A1   Apr. 20, 2006

(51) Int. Cl.
*B32B 37/10* (2006.01)
*H02K 15/02* (2006.01)

(52) U.S. Cl. .................. 156/281; 156/94; 156/285; 156/305; 29/402.02; 29/402.18; 427/142; 264/36.22

(58) Field of Classification Search ............... 156/281, 156/285, 94, 305; 29/402.02, 402.18; 427/142; 264/36.22
See application file for complete search history.

(56) References Cited

U.S. PATENT DOCUMENTS

| 5,431,740 | A | * | 7/1995 | Swain ........................ 134/7 |
|---|---|---|---|---|
| 5,581,869 | A | | 12/1996 | Travaly |
| 5,605,590 | A | | 2/1997 | Manning et al. |
| 5,875,539 | A | * | 3/1999 | Kilpatrick et al. ............ 29/596 |
| 6,102,105 | A | * | 8/2000 | Moran et al. ................. 165/76 |
| 6,367,686 | B1 | * | 4/2002 | Abriles et al. .............. 228/206 |
| 6,554,006 | B2 | * | 4/2003 | Rowe ....................... 134/22.11 |
| 7,073,247 | B2 | * | 7/2006 | Rowe et al. .................. 29/596 |
| 7,150,091 | B2 | * | 12/2006 | Mall et al. .................... 29/596 |
| 2005/0012408 | A1 | | 1/2005 | Kim et al. |

FOREIGN PATENT DOCUMENTS

| EP | 1035947 B1 * | 1/2002 |
|---|---|---|
| EP | 1 524 754 | 4/2005 |
| GB | 1158061 | 7/1969 |

OTHER PUBLICATIONS

GB0520807.9, "Search Report" (Jan. 17, 2006).

* cited by examiner

*Primary Examiner*—Mark A Osele
(74) *Attorney, Agent, or Firm*—Nixon & Vanderhye, PC (57) ABSTRACT

A method includes blasting the interior surfaces of the fitting to stator bar strand joint with $CO_2$ pellets to remove loose copper oxide which otherwise would interfere with proper sealing between an epoxy and the copper surfaces of the joint. After cleaning the surfaces and applying air under pressure to remove particulate material, epoxy is applied to the brazed joints followed by an evacuation of the fitting to strand joint. Subsequent release of the vacuum ensures that the epoxy fills in all crevices or cracks at the joint surfaces and minimizes or eliminates any tendency of the epoxy to delaminate.

17 Claims, 7 Drawing Sheets

METHODS AND SYSTEMS FOR SEALING LIQUID COOLED STATOR BAR END CONNECTIONS FOR A GENERATOR

TECHNICAL FIELD

The present invention relates to methods and systems for effecting seals at the stator bar end connections of a generator and particularly to methods and systems for sealing between stator bar end fittings and outermost strands of the ends of the stator bar as well as between the strands forming the ends of the stator bar.

BACKGROUND OF THE INVENTION

Water cooled stator bars for electrical generators are comprised of a plurality of small rectangular solid and hollow copper strands which are brazed to one another and brazed to an end fitting. The end fitting serves as both an electrical and a hydraulic connection for the stator bar. The end fitting typically includes an enclosed chamber for ingress or egress of stator bar cooling fluid, typically deionized water. Another opening of the end fitting receives the ends of the strands of the stator bar, the fitting and peripherally outermost copper strands of the stator bar end being brazed to one another. Over time, leaks have variously developed about the connection between the stator bar ends and the stator bar fittings as well as between adjacent strands.

There have been a number of prior efforts to seal the leakage paths between the stator bar ends and the stator bar fittings as well as between adjacent stator bar strands. See for example U.S. Pat. No. 5,581,869 issued Dec. 10, 1996 and U.S. Pat. No. 5,605,590 issued Feb. 25, 1997. While these efforts have reduced the likelihood of leaks developing, there remains a need to ensure that both original equipment manufactured parts as well as field repair of leaks uncovered in water cooled generator fitting to strand joints are effectively precluded.

BRIEF DESCRIPTION OF THE INVENTION

In a preferred embodiment of the present invention, there is provided, in a generator having a stator bar including a plurality of strands with one or more of the strands having passages for circulating water in a fitting surrounding and brazed about an end of the bar forming a fitting to strand brazed joint, a method of sealing the fitting to strand joint comprising the steps of:

(a) cleaning interior surfaces of the fitting to strand joint;

(b) applying an epoxy to the interior of the fitting to strand joint; and (c) applying a vacuum to the interior of the fitting-to-strand joint and subsequently releasing the vacuum from the interior of the fitting-to-strand joint to seal the epoxy to the surfaces of the joint.

In another preferred embodiment of the present invention, there is provided, in a generator having a stator bar including a plurality of strands with one or more of the strands having passages for circulating water in a fitting surrounding and brazed about an end of the bar forming a fitting to strand brazed joint, a method of sealing the fitting to strand joint comprising the steps of:

(a) cleaning loose, needle or cubic crystal morphology cupric oxide from interior surfaces of the fitting to strand joint;

(b) leaving a smooth passivated layer of cupric oxide on the interior surfaces;

(c) applying an epoxy to the interior surface of the fitting to strand joint to overlie the passivated layer of cupric oxide; and (d) applying a vacuum to the interior of the fitting to strand joint and subsequently releasing the vacuum from the interior of the fitting to strand joint to seal the epoxy to the surfaces of the passivated layer of cupric oxide on the joint.

In another preferred embodiment of the present invention, there is provided a system for sealing a fitting to strand joint in a generator comprising a generator stator bar including a plurality of strands with one or more of the strands having passages for circulating water; a fitting surrounding and brazed about an end of the bar; a $CO_2$ pellet cleaning head for providing a high velocity stream of $CO_2$ pellets to impact interior surfaces of the fitting to strand joint to clean the joint; an epoxy for applying to the interior of the fitting to strand joint after the joint has been cleaned; and a vacuum pump for applying a vacuum to the interior of the fitting to strand joint which upon subsequent release of the vacuum from the interior of the fitting to strand joint, enables the epoxy to seal the surfaces of the joint.

DETAILED DESCRIPTION OF THE INVENTION

Figure 1:
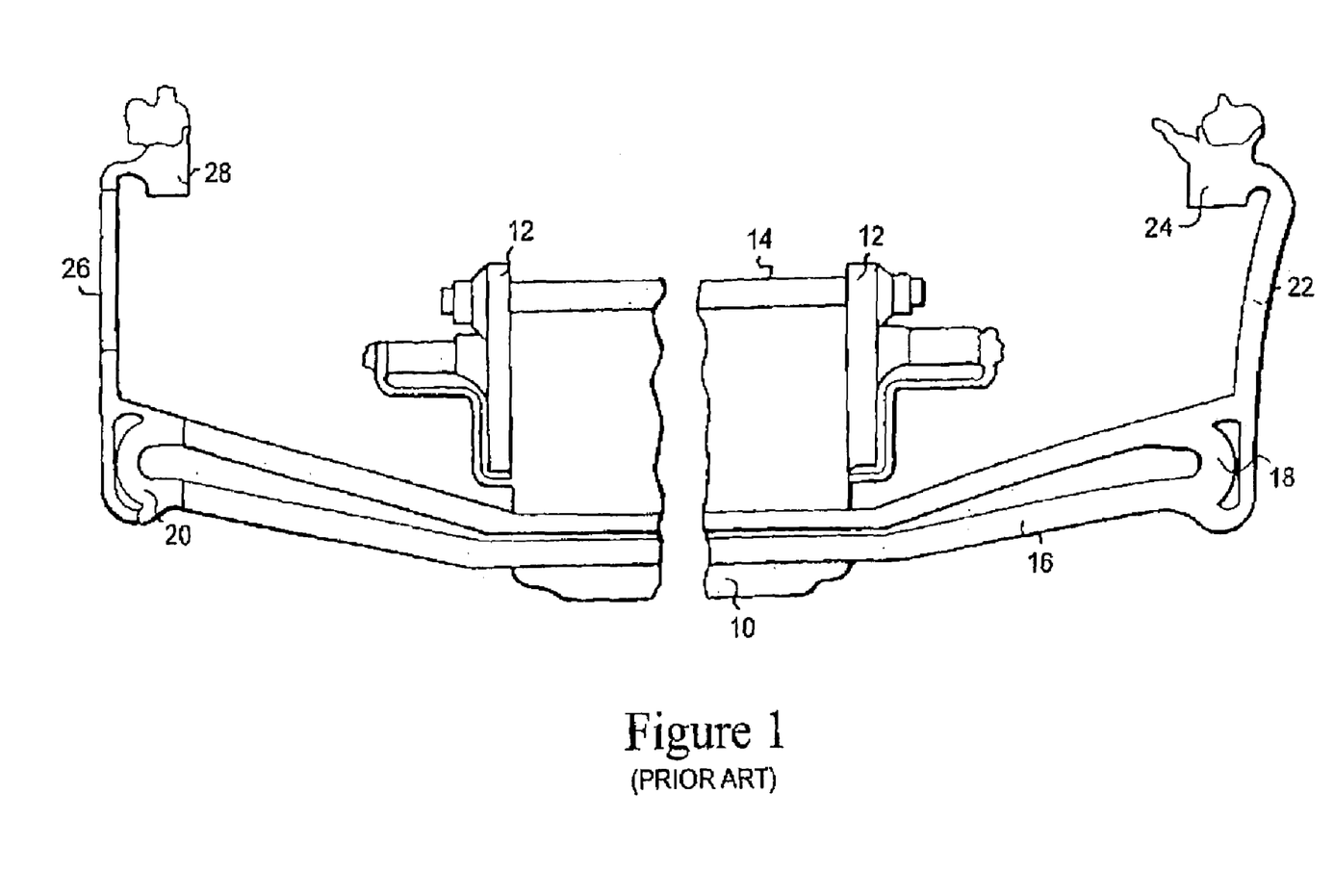
FIG. 1 is a schematic illustration of a liquid cooled stator winding arrangement illustrating the stator bars and end fittings coupled to inlet and outlet coolant headers.
Figure 2:
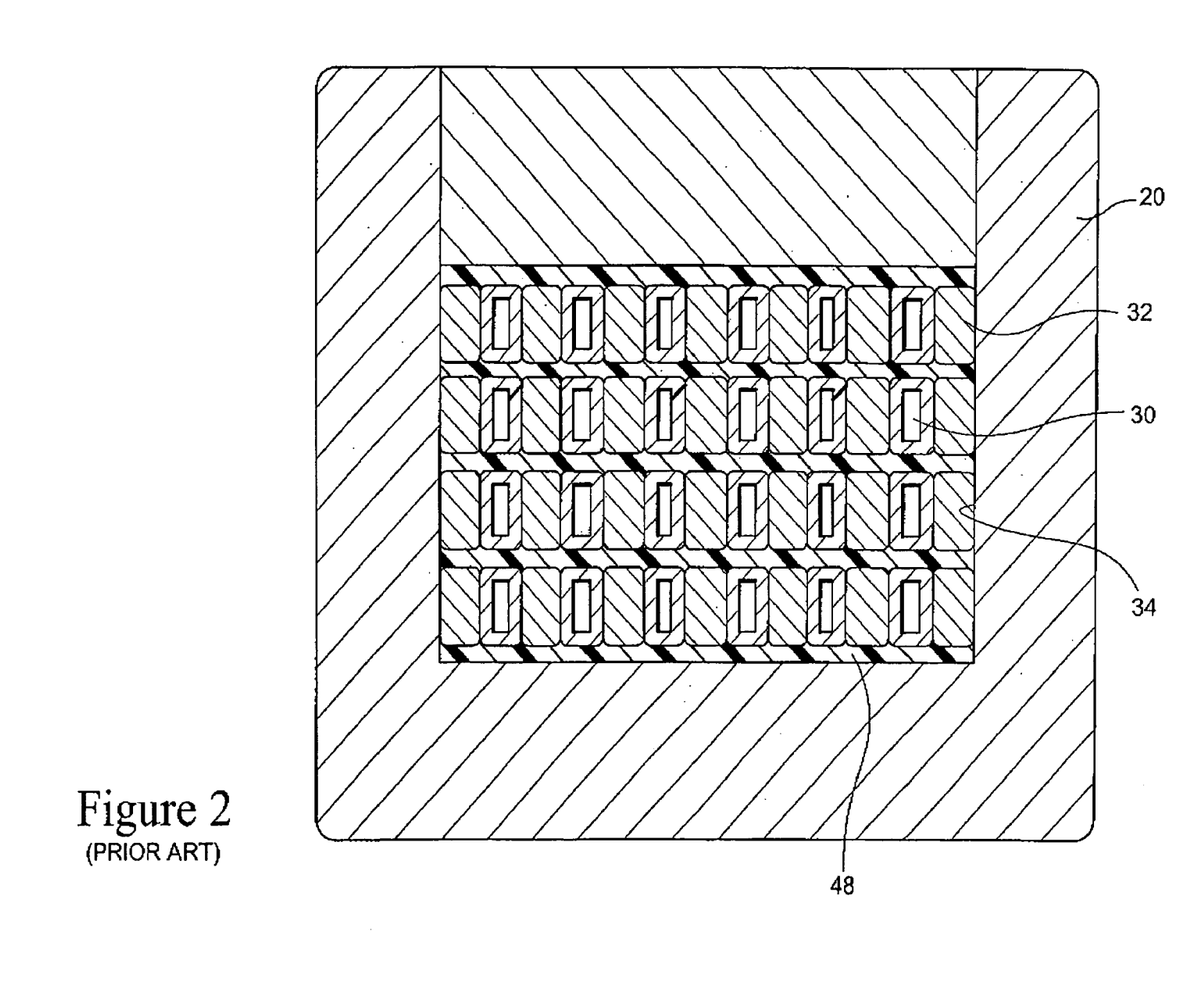
FIG. 2 is a representative end cross-sectional view of the strands of a stator bar within an end fitting.

Referring to FIG. 1, there is illustrated a liquid cooled stator bar winding arrangement used in a typical liquid cooled generator. A stator core 10 having stator core flanges 12 and core ribs 14 are illustrated with stator bars 16 passing through radially extending slots at the stator core and terminating at opposite ends of the end fittings 18,20. Inlet hoses 22 connect inlet fitting 18 to inlet coolant header 24. Outlet hoses 26 connect the outlet fitting 20 to an outlet coolant header 28. As illustrated in FIG. 2, each stator bar includes a plurality of hollow and solid copper strands 30,32, respectively, disposed in side by side and superposed relation one to the other. The fittings, for example fittings 18,20 are similarly formed of an electrically conductive material such as copper.

Figure 3:
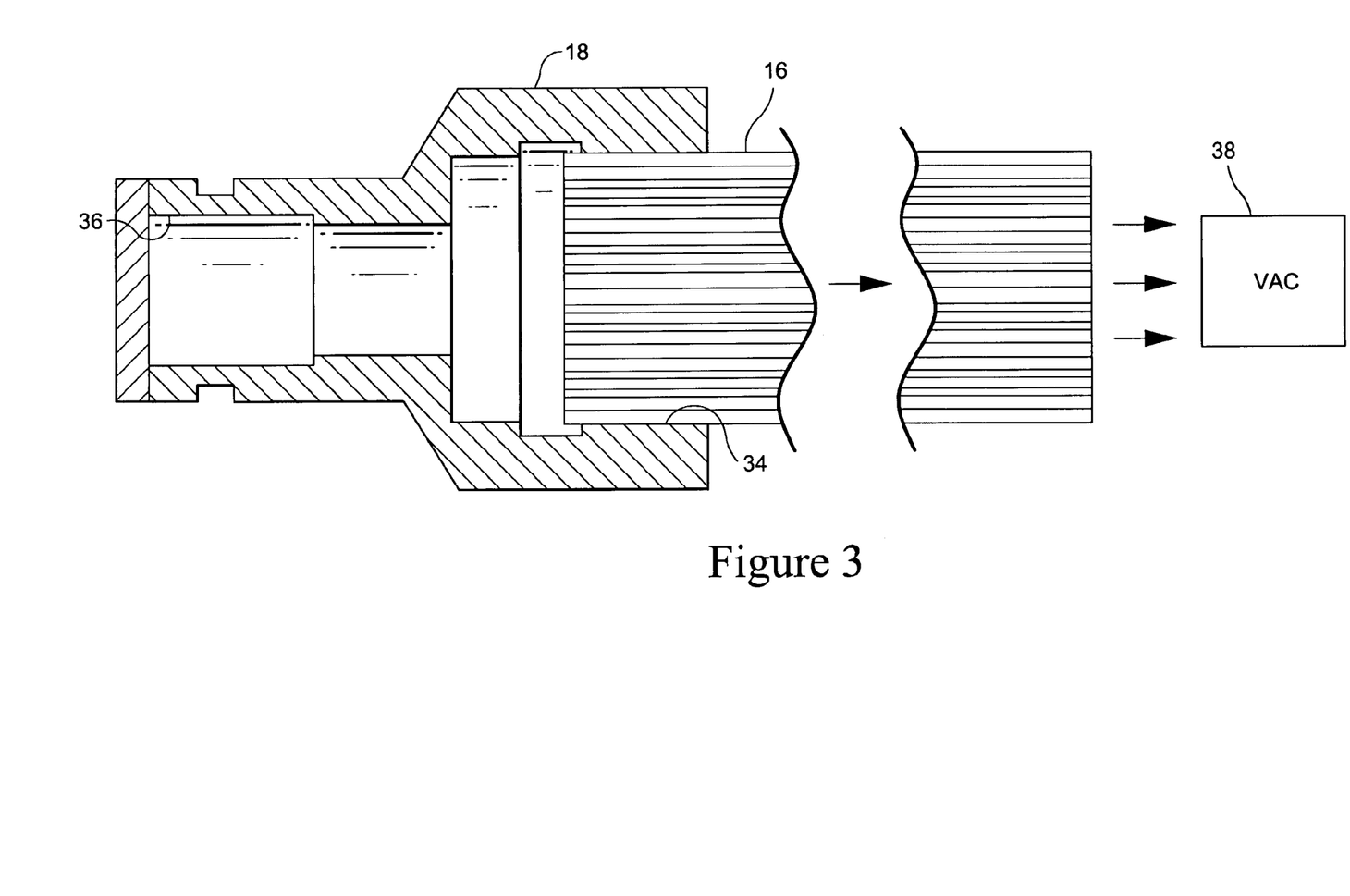
FIGS. 3-7 are cross-sectional views of the fitting and end strands of the stator bar illustrating various steps in accordance with a preferred aspect of the present invention.

As illustrated in FIG. 3, fitting 18, for example, may comprise a closed body having a generally rectilinear opening 34 for receiving the strands 30,32 of the stator bar 16. At the opposite end of the fitting 18, there is provided an opening 36 which, in use, is normally closed by a copper tube which serves as both an electrical connection as well as a hydraulic conduit for flowing liquid coolant, e.g., deionized water into or from the chamber 36 defined by the fitting and the exposed ends of the hollow copper strands. The liquid in the chamber either flows into the fitting and through the hollow strands 30 for cooling purposes when the fitting comprises an inlet fitting or receives the liquid coolant from the hollow strands 30 for egress when the fitting is employed as an outlet fitting. It will be appreciated that there are other types of fittings such as disclosed in U.S. Pat. No. 5,605,590 issued Feb. 25, 1997 of common assignee herewith and which disclosure is incorporated herein by reference.

Typically, the strands of copper forming the stator bar are brazed to one another as well as to the inside walls of the fittings. The brazing material may comprise, e.g., a copper phosphorus alloy. As illustrated in FIG. 2, the strands are also brazed to one another within the stator bar. It will be appreciated that leakage paths, should one or more develop, can be circuitous such that the external outlet of the leakage paths may be far removed from the inlet of the leakage paths in communication with the chamber of the fitting. Thus, a leakage path may develop from within the strands of copper and extend well beyond the fitting manifesting itself along the external periphery of the stator bar. A leakage path may develop at the joint between the fitting and strands and manifest itself externally along a side of the joint opposite from the initiation or inlet portion of the leakage path. Because it is extremely difficult to identify particular leakage paths once a leak has been initiated, it has become customary to seal the interior of the fitting with an epoxy in order that the epoxy sealant serve as an insulation barrier between the liquid coolant and the brazing alloy. It is also conventional to apply the epoxy, for example in two parts for penetration and wet out followed by a high viscosity modification of the same liquid epoxy resin to overlie the brazing material between the fitting and the outermost strands of the stator bars as well as between the strands themselves. The liquid epoxy resin may be of the type described in U.S. Pat. No. 5,350,815 of common assignee herewith, the disclosure which U.S. patent is incorporated herein by reference. It will also be appreciated that other types of resins may be utilized for example those identified in U.S. Pat. No. 5,605,590.

It has recently been discovered that the application of epoxy over a fitting to strand braze joint may cause delamination of the epoxy from copper allowing water under the epoxy. Should this crack in the epoxy give access for water to a submerged pore or crevice in the copper, then crevice corrosion or degradation may occur notwithstanding the application of the epoxy sealant. It is believed that the epoxy may delaminate because the copper oxide bond to the copper is in many cases weak. For example, shrinkage of the epoxy during curing produces stresses that lead to fracture of the epoxy bond to the copper metal. The fracture of the bond of the epoxy to the copper metal is also believed to be a result of operating the cooling system of the generator with low oxygenation of the cooling fluid or fluids containing acids.

As will be appreciated, highly oxygenated water is typically used to flow through the copper strands for cooling the stator bars. Under normal circumstances water and oxygen in water corrodes the copper and converts the metal to copper oxide (CuO) and typically the copper oxide degrades leaving a hole in the copper. However, there is a passivating phenomena that occurs as long as the oxygen level within the water is maintained sufficiently high to provide a very dense layer of copper oxide on the copper. This dense layer may continue to corrode but at a sufficiently low rate that it is not penetrable by the water. Thus, a passivating layer of the copper oxide is formed which is very dense, highly resistant to corrosion, and therefore desirable. This passivating layer may last for the life of the generator provided high oxygenation level of the cooling fluid, e.g., water, are maintained.

Because small crevices are sometimes present in the manufactured strand to copper braze joint, crevice corrosion may occur. Crevice corrosion can occur under normal operating conditions if a sufficiently deep manufacturing defect is present. The crevice will corrode under conditions when the CuO formation passivated the copper surface outside the crevice and thus is an unusual corrosion condition. The presence of a phosphorous containing braze metal will accelerate the rate of this corrosion.

The copper oxide can exist in two forms. For example, a passivated smooth oxide layer of less than 1 to 2 mils thick will be formed on the copper fitting and strands. This is the normal oxide morphology in the generator water cooling system. The second form of cupric oxide is of a loose, needle or cubic crystal morphology. The latter form of cupric oxide forms on a passivated surface after the passivated smooth oxide copper has been subjected to operation in a low oxygen environment, i.e., less than 500 ppb in water, for sufficient time followed by and return to high oxygen conditions, i.e., greater than 2 ppm in water. That is, once the loose, needle or cubic crystal morphology copper oxide is formed, it is not eliminated by a return to a highly oxygenated water cooling system. It is believed that this crystal morphology can exist on the internal surfaces of connector 18, on the water exposed surfaces of bar 16 and at the inlet of the crevices in the fitting to strand braze joint. Accordingly, epoxy applied for sealing purposes would adhere to this oxide. However, under the stress of the epoxy curing, i.e., surface tension, this second form of cupric oxide breaks loose from the surface delaminating the epoxy from the fitting and joint. A method of sealing according to an aspect of the present invention, minimizes or eliminates leakage paths by removing any loose copper oxide prior to application of the epoxy and particularly by removing the loose, needle or cubic crystal copper oxide in situ.

Figure 4:
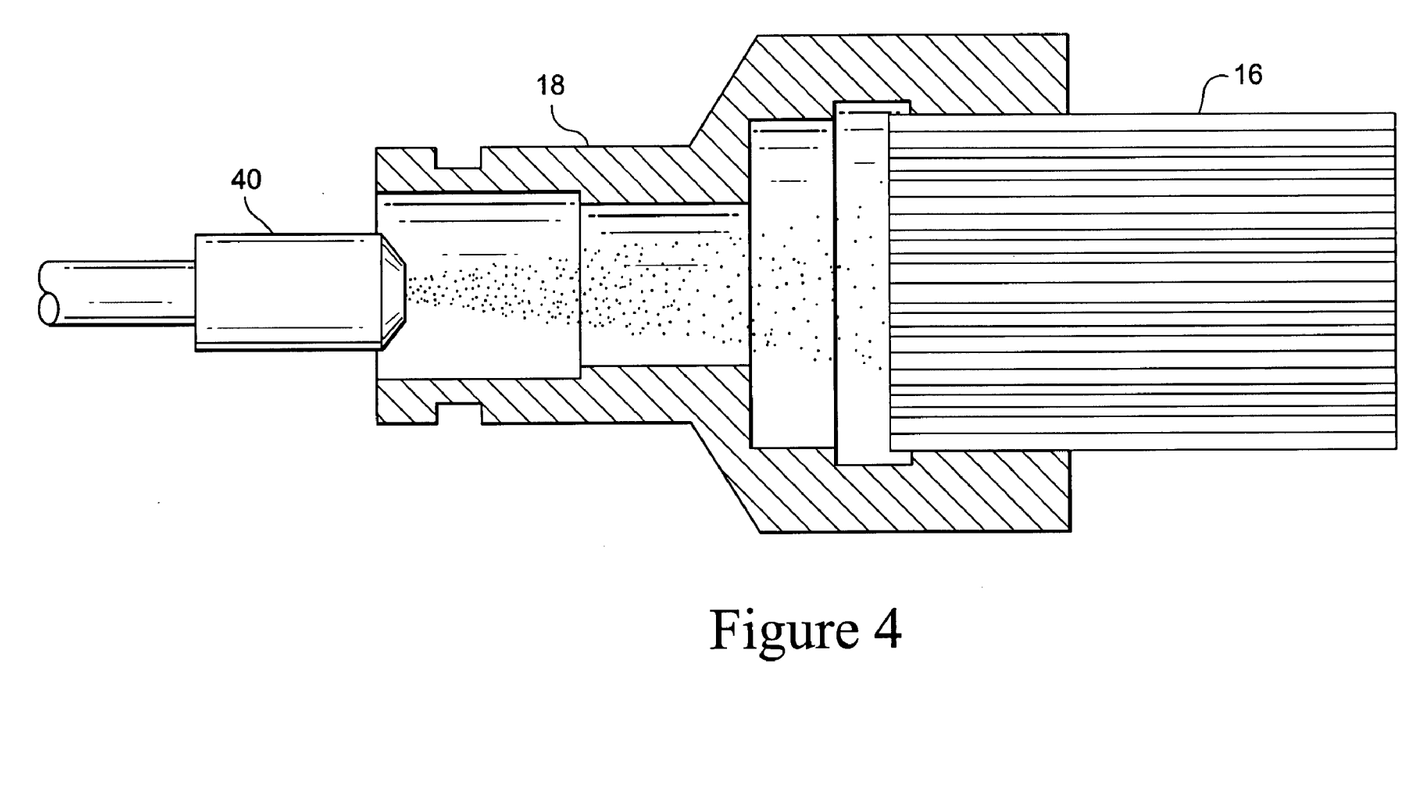

Particularly, referring to FIG. 3, and after shutdown and removal of water from the cooling system, one end of the fitting opposite the strands of the stator bar is closed. A vacuum is then applied to the opposite end of the stator bar using a suitable vacuum pump 38. The purpose of the vacuum is to dry the fitting and strand ends within the fitting. As illustrated in FIG. 4, the end faces of the strands as well as the material of the fitting 18 at the brazed joint are $CO_2$ pellet blasted using a conventional $CO_2$ pellet blasting tool 40. Such tool is commercially available, e.g., from RSG-Technologies, 29 Industrial Park Drive, Dover, N.H. 03820 under Model Nos. 1535, 1535H and 1560. By $CO_2$ pellet blasting is meant a high velocity stream of $CO_2$ pellets (dry ice) used to impact and clean a surface. By using $CO_2$ pellets to clean and remove any copper oxide of the loose, cubic or needle morphology, the fitting and strands are not contaminated (the $CO_2$ pellets on impact change to their gaseous state) and there is no risk of plugging the hollow conductor water cooling passages of the stator bar strands since no residue remains. Also, by first drying the fitting and strands using the vacuum pump of FIG. 3, the particulates are prevented from adhering to the metal surface. The $CO_2$ pellet blasting should be directed to impact all internal surfaces of the fitting to strand joint to which epoxy would be applied and adhered.

Figure 5:
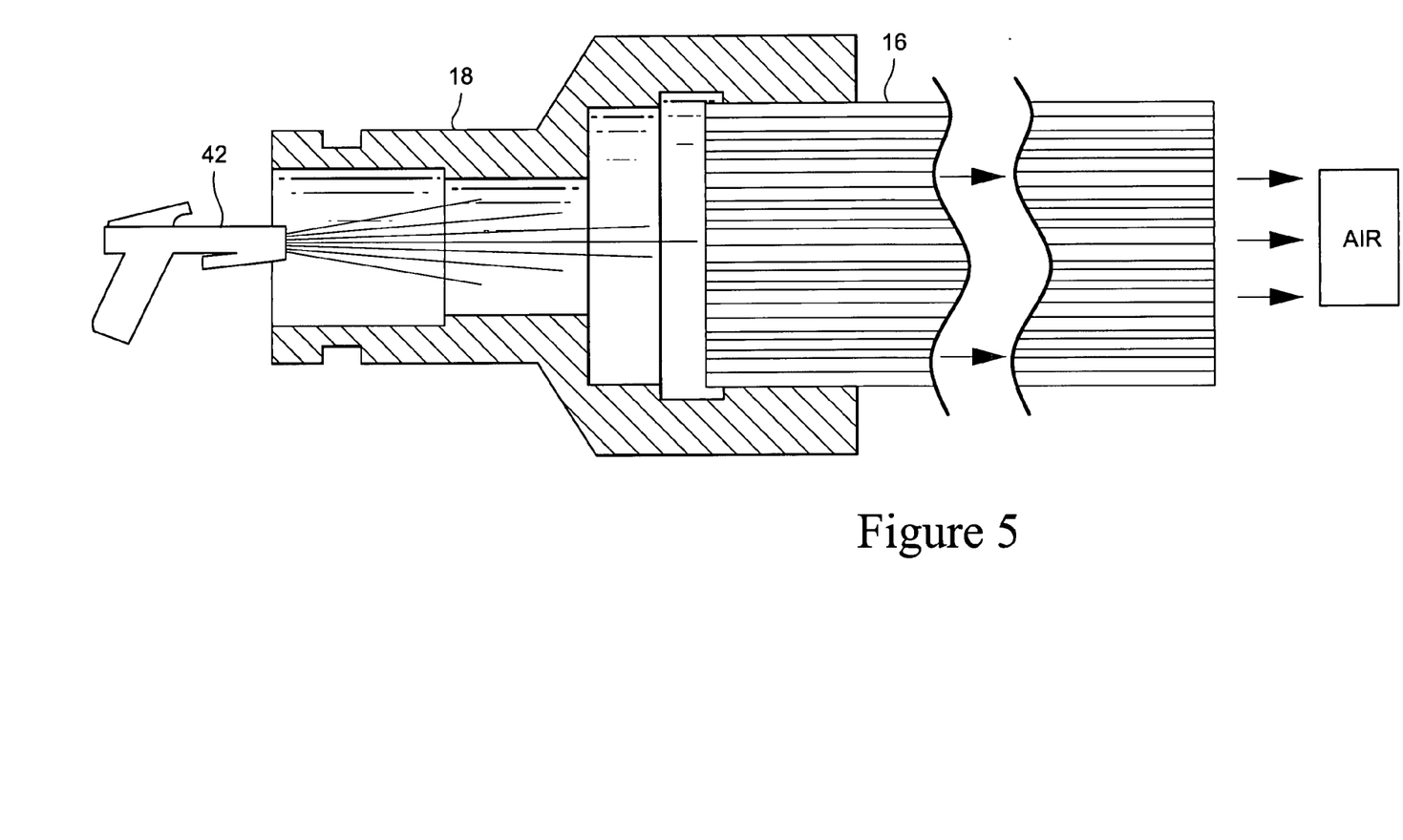

Referring now to FIG. 5, and after blasting $CO_2$ pellets to remove the loose cupric oxide from the fitting to strand joint, air is blown through the fitting and stator bar strands to remove any remaining loose copper oxide particulate from the fitting. A tool 42 for supplying air under pressure to the interior of the fitting and strand ends is illustrated in FIG. 5. In order to improve penetration of the epoxy into the cavity of the fitting to strand braze to improve the barrier to access of water into any crevices, it is highly desirable that the epoxy completely fill the crevices. By completely filling the crevices with epoxy, the crevices will not develop into leakage paths even if the outer epoxy fill delaminates from the brazed fitting surface. This will increase the probability that the leak would be sealed and crevice corrosion ended. This is accomplished by vacuum impregnation of the epoxy.

Figure 6:
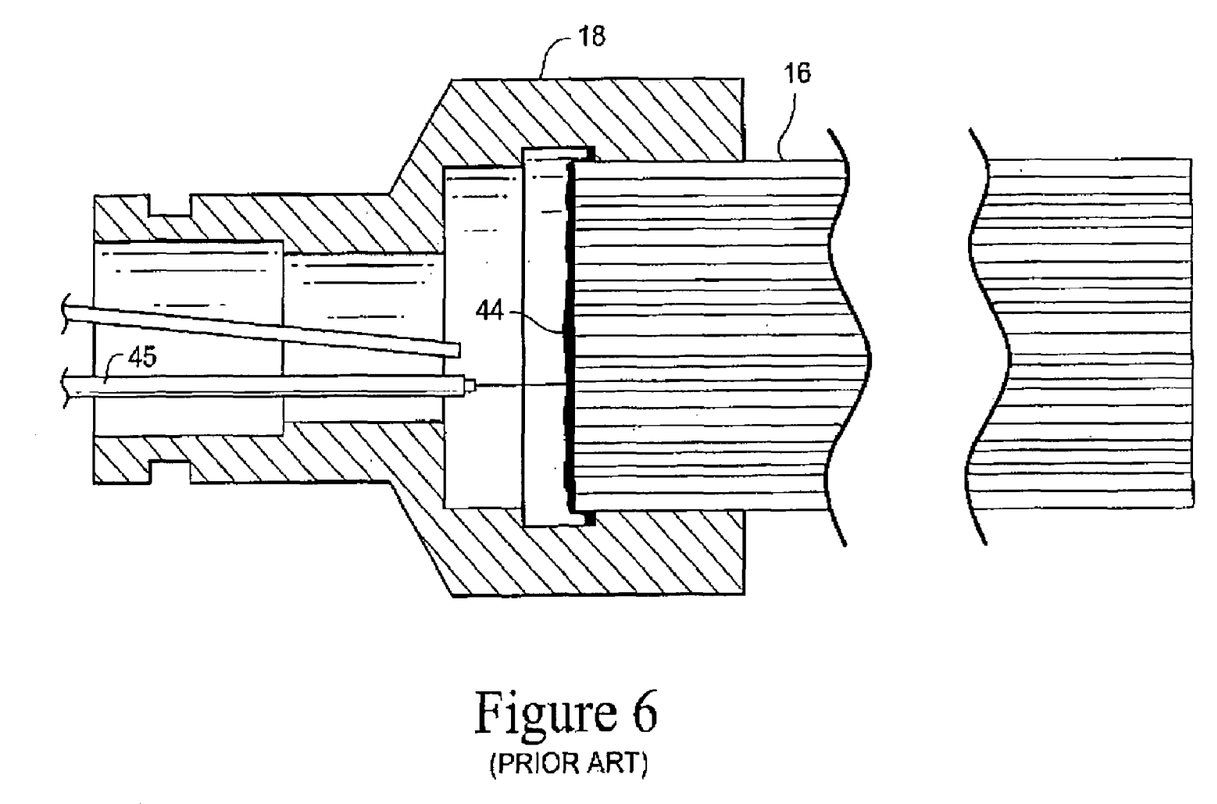
Figure 7:
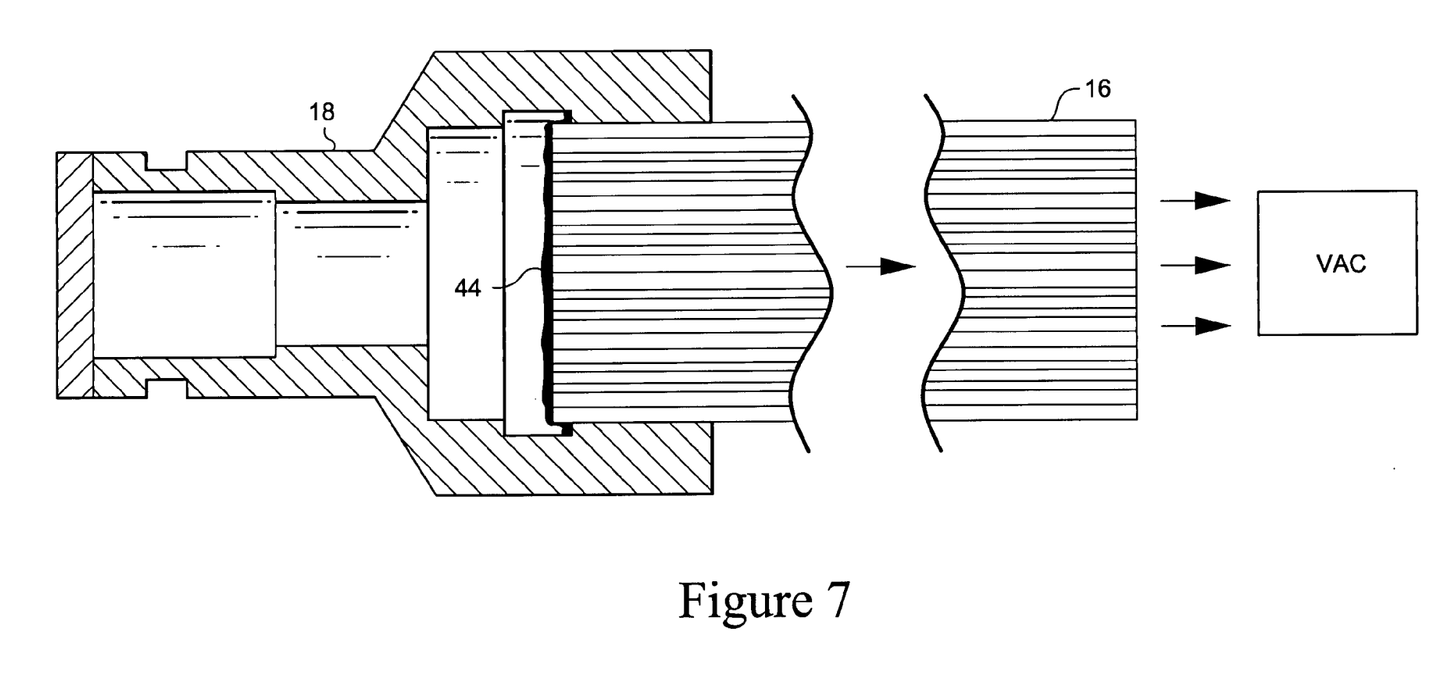

Referring to FIG. 6, the epoxy 44 is applied to the fitting to strand joint similarly as in prior U.S. Pat. No. 5,605,590. For example, a syringe 45 may be used. Subsequently, the vacuum may be accomplished by sealing the opposite end of the stator bar as illustrated, connecting a vacuum hose to the fitting and evacuating the interior volume to a pressure of 10 torrs or less. If the epoxy as applied has surface tension and does not completely fill the cracks or crevices, when the vacuum is released any air between the epoxy and the surface of the crack or crevice bubbles out. The epoxy is thus forced into the crack or crevice. With the initial removal of the loose copper oxide, a better seal between the epoxy and copper is afforded. Thus, by removing the loose, copper oxide while leaving a passivated smooth layer of copper oxide, a smooth clean surface for adherence of epoxy is provided. Moreover, the application of the vacuum to the fitting and stator bar after application of the epoxy by means of the vacuum pump illustrated in FIG. 7 ensures that the epoxy completely fills into any crevices or cracks that may be present The high stresses formed due to epoxy shrinkage across the fitting or strands will not form over the short dimensions of the crevice or crack. Thus, delamination of the epoxy from the crevice surface will not likely occur and the epoxy filled crevices will be well sealed from access by the water.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a generator having a stator bar including a plurality of strands, with one or more of the strands having passages for circulating water, in a pair of fittings surrounding and brazed about opposite ends of the bar forming a pair of fitting-to-strand brazed joints, a method of sealing one of the fitting-to-strand joints comprising the steps of, in sequence:
   (a) cleaning interior surfaces of the one fitting-to-strand joint;
   (b) applying an epoxy to the interior of the one fitting-to-strand joint; and
   (c) applying a vacuum to the interior of the one fitting-to-strand joint from the fitting at the opposite end of the bar and subsequently releasing the vacuum from the interior of the one fitting-to-strand joint to seal the epoxy to the surfaces of the joint.

2. A method according to claim 1, wherein step (a) includes blasting particles to impact the interior surfaces of the one fitting-to-strand joint.

3. A method according to claim 2, including blasting $CO_2$ pellets onto the interior surface of the one fitting-to-strand joint.

4. A method according to claim 1, wherein step (b) includes applying the epoxy to the interior surfaces using a hypodermic syringe.

5. A method according to claim 1, wherein step (c) includes releasing the vacuum to displace the epoxy into crevices of the joint.

6. A method according to claim 1, wherein the one fitting-to-strand joint includes a layer of loose, needle or cubic crystal morphology cupric oxide on certain of the interior surfaces and step (a) includes blasting the layer of the cupric oxide with $CO_2$ pellets to remove the layer prior to steps (b) and (c).

7. A method according to claim 1, wherein step (a) includes supplying particles under pressure through an end of the one fitting opposite ends of the strands of the stator bar to clean the interior surfaces.

8. A method according to claim 7, wherein step (a) includes blasting $CO_2$ pellets onto the interior surfaces of the one fitting-to-strand joint.

9. In a generator having a stator bar including a plurality of strands with one or more of the strands, having passages for circulating waters, in a pair of fittings surrounding and brazed about opposite ends of the bar forming a pair of fitting-to-strand brazed joints, a method of sealing one of the fitting-to-strand joints comprising the steps of, in sequence:
   (a) cleaning a loose, needle or cubic crystal morphology cupric oxide from interior surfaces of the one fitting-to-strand joint;
   (b) leaving a smooth passivated layer of cupric oxide on the interior surfaces;
   (c) applying an epoxy to the interior surface of the one fitting-to-strand joint to overlie the passivated layer of cupric oxide; and
   (d) applying a vacuum to the interior of the one fitting-to-strand joint from the fitting at the opposite end of the bar and subsequently releasing the vacuum from the interior of the fitting-to-strand joint to seal the epoxy to the surfaces of the passivated layer of cupric oxide on the joint.

10. A method according to claim 9, wherein step (a) includes blasting particles to impact the passivated layer of cupric oxide on the interior surfaces of the one fitting-to-strand joint.

11. A method according to claim 10, including blasting $CO_2$ pellets onto the passivated layer of cupric oxide on the interior surfaces of the one fitting-to-strand joint.

12. A method according to claim 9, wherein step (c) includes applying the epoxy to the interior surfaces using a hypodermic syringe.

13. A method according to claim 9, wherein step (d) includes releasing the vacuum to displace the epoxy into crevices of the joint.

14. A method according to claim 9, wherein step (a) includes supplying particles under pressure through an end of the one fitting opposite ends of the strands of the stator bar to clean the interior surfaces.

15. A method according to claim 14, wherein step (a) includes blasting $CO_2$ pellets onto the interior surfaces of the one fitting-to-strand joint.

16. A system for sealing a fitting-to-strand joint in a generator comprising:
   a generator stator bar including a plurality of strands with one or more of the strands having passages for circulating water;
   a pair of fittings surrounding and brazed about respective opposite ends of the bar each fitting establishing a fitting-to-strand joint;
   a $CO_2$ pellet cleaning head for providing a high velocity stream of $CO_2$ pellets to impact interior surfaces of the fitting-to-strand joint at one end of the bar to clean the joint;
   an epoxy for applying to the interior of the fitting-to-strand joint at said one end of the bar after the joint has been cleaned; and
   a vacuum pump for applying a vacuum to the interior of the fitting-to-strand joint at said one end of said bar via the fitting-to-strand joint at the opposite end of said bar which upon subsequent release of the vacuum from the interior of the fitting-to-strand joint at said one end of the bar, enables the epoxy to seal the surfaces of the fitting-to-strand joint at said one end of the bar.

17. A system according to claim 16 wherein step (b) includes a hypodermic syringe for applying the epoxy to the interior surfaces at the fitting-to-strand joint.

* * * * *